(12) United States Patent
Shih

(10) Patent No.: US 7,095,475 B2
(45) Date of Patent: Aug. 22, 2006

(54) DATA ARRANGEMENT FOR LIQUID CRYSTAL DISPLAY DEVICE

(75) Inventor: An Shih, Miao-Li (TW)

(73) Assignee: Toppoly Optoelectronics Corp., Miao-Li (TW)

( * ) Notice: Subject to any disclaimer, the term of this patent is extended or adjusted under 35 U.S.C. 154(b) by 204 days.

(21) Appl. No.: 10/681,098

(22) Filed: Oct. 9, 2003

(65) Prior Publication Data

US 2004/0080701 A1 Apr. 29, 2004

(30) Foreign Application Priority Data

Oct. 25, 2002 (TW) ........................... 91124957 A

(51) Int. Cl.
*G02F 1/1335* (2006.01)
*G02F 1/1343* (2006.01)
*G02F 1/1345* (2006.01)

(52) U.S. Cl. .................. 349/149; 349/139; 349/106; 345/97; 345/103

(58) Field of Classification Search ................ 349/106, 349/139, 149; 345/97, 103
See application file for complete search history.

(56) References Cited

U.S. PATENT DOCUMENTS 5,298,913 A * 3/1994 Numao et al. ................ 345/97
6,580,486 B1 * 6/2003 Sekine ........................ 349/139
6,806,862 B1 * 10/2004 Zhang et al. ................ 345/103

* cited by examiner

Primary Examiner—Huyen Ngo
(74) Attorney, Agent, or Firm—Finnegan, Henderson, Farabow, Garrett & Dunner, L.L.P.

(57) ABSTRACT

A liquid crystal display (LCD) interface that includes a plurality of first transmission lines including N sets of transmission lines, each set of the first transmission lines being associated with a pixel formed in the LCD device, and a plurality of second transmission lines, each being coupled to one the plurality of first transmission lines, the plurality of second transmission lines including a plurality of sets, alternating in odd-numbered and even-numbered sets, each set of the second transmission lines corresponding to the plurality of first transmission lines, and each set including a plurality of subsets, each being associated with a pixel formed in the LCD device, wherein an M-th subset of each of the odd-numbered sets of the second transmission lines is coupled to an M-th set of the first transmission lines, and an M-th subset of each of the even-numbered sets of the second transmission lines is coupled to an (N−M+1)-th set of the first transmission lines, M being an integral between 1 and N.

18 Claims, 2 Drawing Sheets

DATA ARRANGEMENT FOR LIQUID CRYSTAL DISPLAY DEVICE

TECHNICAL FIELD

This invention pertains in general to a liquid crystal display ("LCD") device and, more particularly, to an LCD interface and method for applying data into an LCD.

BACKGROUND

Conventional thin film transistor liquid crystal display ("TFT-LCD") devices or low temperature poly-silicon ("LPTS") LCD devices include a matrix of transistors for actuating display of an image. Each transistor includes a gate electrically coupled to a scan line, a source electrically coupled to a data line, and a drain electrically coupled to a storage capacitor. Scan lines and data lines are in turn respectively coupled to a scan line driving circuit and a data line driving circuit disposed at an LCD interface. The data line driving circuit usually includes shift registers and switches to control application of data into an LCD device through a plurality of data signal lines. Specifically, data, for example, video image data, are provided from the shift registers through the data signal lines and the switches to the data lines of an LCD device.

FIG. 1 is a layout of a conventional LCD interface showing how a conventional technique provides data signals to an LCD device. Referring to FIG. 1, a first set of data including data signals DS1 to DS12 is provided to an LCD device (not shown) from a shift register (not shown) to a plurality of data signal lines DL1 to DL12, and data lines DK1 . . . DKn of the LCD device through switches SW1 . . . SWn. For instance, a first data signal DS1 of the first set of data DS1 to DS12 is provided by a first shift register to data signal line DL1 and then through a switch SW1 to a data line DK1 which corresponds to, for example, a red ("R") sub-pixel region of a pixel (not shown) of an LCD device. Subsequently, a second data signal DS2 of the first set of data DS1 to DS12 is provided by the first shift register to data signal line DL2 and then through a switch SW2 to a data line DK2, which corresponds to a green ("G") sub-pixel region of a pixel. Likewise, a third data signal DS3 of the first set of data DS1 to DS12 is provided by the first shift register to data signal line DL3 and then through a switch SW3 to a data line DK3, which corresponds to a blue ("B") sub-pixel region of a pixel. The R, G and B sub-pixel regions constitute a pixel of the LCD device.

As a result, the first set of data is provided in the order of writing data signals DS1 to DS12 from the first data signal line DL1 to the final data signal line DL12. After the first set of data, a second set of data DS13 to DS24 is provided by a second shift register (not shown) to the LCD panel in a same order of writing from data signal line DL1 to data signal line DL12. This order of applying data signals from a shift register to data lines of the LCD device is also applicable to any set of data that follows.

The conventional technique may encounter a disadvantage in that a difference in the gray scale between the same sub-pixel regions of two adjacent pixels may become visible to the human eyes. The problem is caused by a difference in resistance and distributed capacitance present between two data lines of significantly different transmission lengths. For example, for the R sub-pixel regions of two adjacent pixels, the transmission length associated with data signal DS10 of the first set of data is significantly longer than that of data signal DS13 of the second set of data. Similarly, for the G sub-pixel regions, the transmission length associated with data signal DS11 is significantly longer than that of data signal DS14. Again, for the B sub-pixel regions, the transmission length associated with data signal DS12 is significantly longer than that of data signal DS15. As a result, the pixel represented by data signals DS10 to DS12 of the first set of data may have a visible difference in the gray scale from an adjacent pixel represented by data signals DS13 to DS15 of the second set of data.

The problem of different gray scale usually occurs at two adjacent pixels where in the respective R, G and B sub-pixel regions are coupled to a leading set of data signal lines such as DL1 to DL3 and an ending set of data signal lines such as DL10 to DL12, respectively. Besides, the problem would become worse as more data signal lines are used.

SUMMARY OF THE INVENTION

Accordingly, the present invention is directed to a method and an LCD interface that obviate one or more of the problems due to limitations and disadvantages of the related art.

Additional features and advantages of the present invention will be set forth in the description which follows, and in part will be apparent from the description, or may be learned by practice of the invention. The objectives and other advantages of the invention will be realized and attained by the devices and methods particularly pointed out in the written description and claims thereof, as well as the appended drawings.

To achieve these and other advantages, and in accordance with the purpose of the invention as embodied and broadly described, there is provided an LCD interface that includes a plurality of first transmission lines, and a plurality of second transmission lines, each being coupled to one of the plurality of first transmission lines, wherein the plurality of second transmission lines includes a plurality of sets, alternating in odd-numbered and even-numbered sets, each set of the second transmission lines corresponding to the plurality of first transmission lines, and including a plurality of subsets, each subset including a first line for a first color region, a second line for a second color region, and a third line for a third color region of a pixel formed in the LCD panel, and wherein the plurality of first transmission lines includes a plurality of sets, each set of first transmission line including a first line for a first color region, a second line for a second color region, and a third line for a third color region of a pixel, such that a first set of first transmission lines is coupled to a first subset of each of the odd-numbered sets of the second transmission lines and a final subset of each of the even-numbered sets of the second transmission lines.

In one aspect, the plurality of first transmission lines include N sets of transmission lines such that an M-th subset of each of the odd-numbered sets of the second transmission lines is coupled to an M-th set of the first transmission lines, M being an integral between 1 and N.

In another aspect, the plurality of first transmission lines include N sets of transmission lines such that an M-th subset of each of the even-numbered sets of the second transmission lines is coupled to an (N−M+1)-th set of the first transmission lines, M being an integral between 1 and N.

Also in accordance with the present invention, there is provided an LCD interface that includes a plurality of first transmission lines including N sets of transmission lines, each set of the first transmission lines being associated with a pixel formed in the LCD device, and a plurality of second transmission lines, each being coupled to one the plurality of first transmission lines, the plurality of second transmission lines including a plurality of sets, alternating in odd-numbered and even-numbered sets, each set of the second transmission lines corresponding to the plurality of first transmission lines, and each set including a plurality of subsets, each being associated with a pixel formed in the LCD device, wherein an M-th subset of each of the odd-numbered sets of the second transmission lines is coupled to an M-th set of the first transmission lines, and an M-th subset of each of the even-numbered sets of the second transmission lines is coupled to an (N−M+1)-th set of the first transmission lines, M being an integral between 1 and N.

In one aspect, the first transmission lines include 12 transmission lines and the integral N is equal to 4.

Yet in accordance with the present invention, there is provided a method or providing data to an LCD panel that includes providing a plurality of sets of first transmission lines, providing a plurality of sets of second transmission lines alternating in odd-numbered and even-numbered sets, coupling each of the second transmission lines to one of the plurality of first transmission lines such that each set of second transmission lines corresponds to the plurality of first transmission lines, providing a plurality of subsets for each set of the second transmission lines, each subset being associated with a pixel formed in the LCD device, coupling an M-th subset of each of the odd-numbered sets of the second transmission lines to an M-th set of the first transmission lines, M being an integral between 1 and N, coupling an M-th subset of each of the even-numbered sets of the second transmission lines to an (N−M+1)-th set of the first transmission lines, providing a first set of data from the plurality of first transmission lines to the odd-numbered sets of the second transmission lines, and following the first set of data, providing a second set of data from the plurality of first transmission lines to the even-numbered sets of the second transmission lines.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate embodiments consistent with the invention and, together with the description, serve to explain the objects, advantages, and principles of the invention.

In the drawings.

DESCRIPTION OF THE EMBODIMENTS

Reference will now be made in detail to embodiments consistent with the invention, examples of which are illustrated in the accompanying drawings. Wherever possible, the same reference numbers will be used throughout the drawings to refer to the same or like parts.

Figure 1:
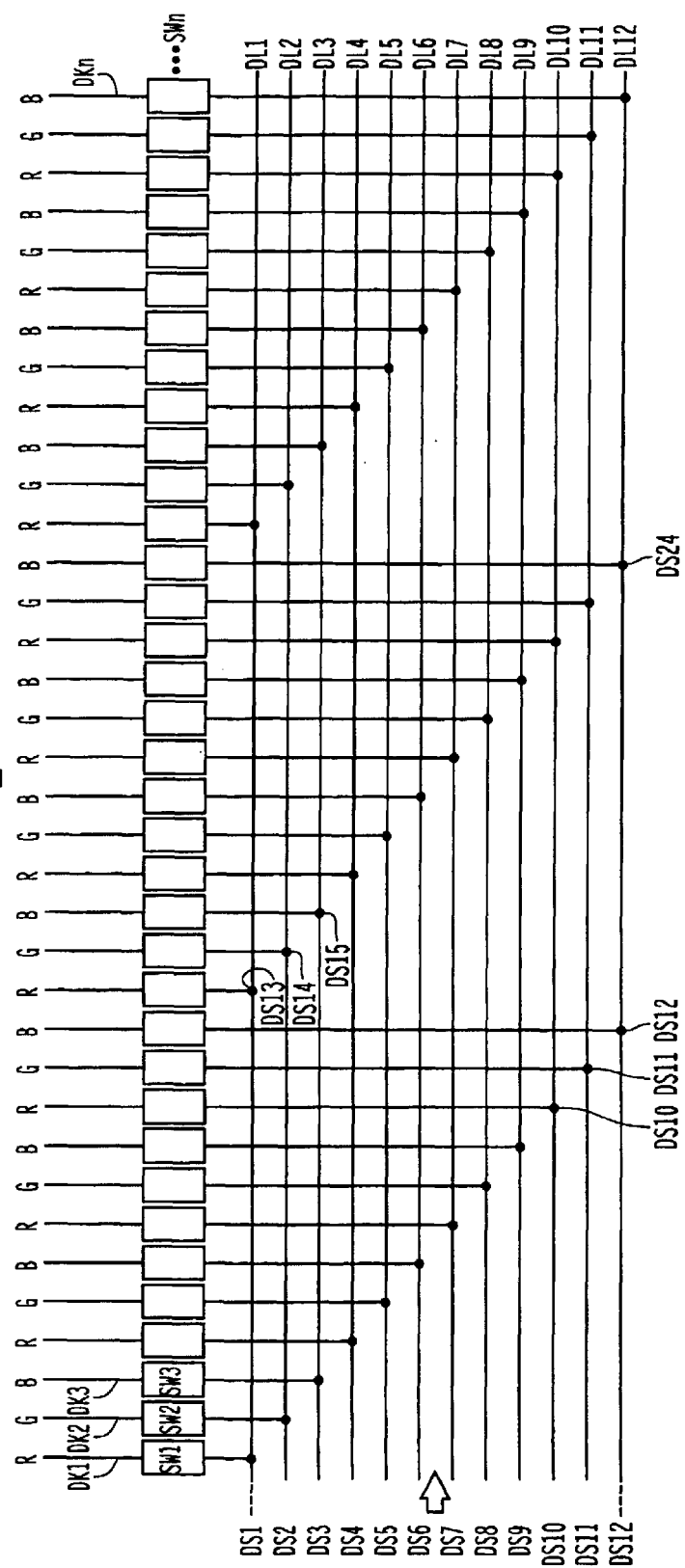
FIG. 1 is a layout of a conventional LCD interface.
Figure 2:
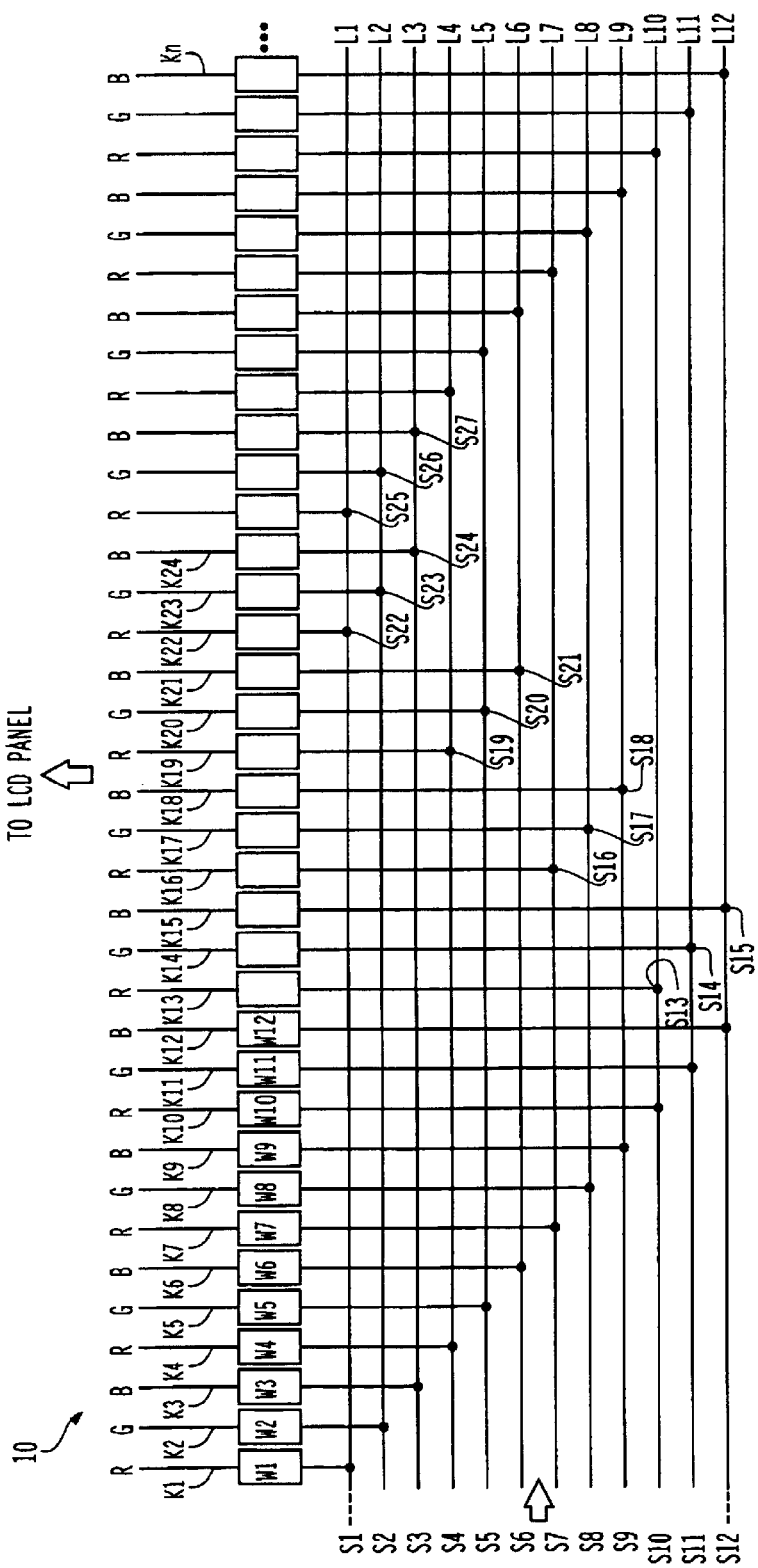
FIG. 2 is a layout of an LCD interface in accordance with one embodiment of the present invention.

FIG. 2 shows an LCD interface 10 in accordance with one embodiment of the present invention. Referring to FIG. 2, LCD interface 10 includes a plurality of data signal lines L1 to L12 and a plurality of data lines K1 . . . Kn. Each data line is coupled to one of data signal lines L1 to L12. In the present embodiment, LCD interface 10 includes 12 data signal lines. In other embodiments, however, LCD interface 10 may include 24 or 48 data signal lines.

Data signal lines L1 to L12 are coupled to shift registers (not shown) from which data signals are provided to data signal lines L1 to L12. For example, a first shift register provides a first set of data signals S1 to S12, and a second shift register provides a second set of data signals S13 to S24 to data signal lines L1 to L12. The first shift register controls a first set of switches W1 to W12 so that the first set of data signals S1 to S12 are sent to an LCD device (not shown) over a first set of data lines K1 to K12.

Each set of the data lines is defined in subsets such that each subset includes the number of data required for a pixel. For example, a first subset (K1 to K3) of the first set of data lines K1 to K12 includes a first data line K1 for an R sub-pixel region, a second data line K2 for a B sub-pixel region, and a third data line K3 for a G sub-pixel region. Data signal lines L1 to L12 are defined in sets such that each set of data signal lines L1 to L12 is coupled to a subset of data lines. For example, a first set (L1 to L3) of data signal lines L1 to L12 is coupled to the first subset (K1 to K3) of the first set of data lines K1 to K12. The first set (L1 to L3) of data signal lines L1 to L12 includes a first data signal line L1 for an R sub-pixel region, a second data signal line L2 for a G sub-pixel region, and a third data signal line L3 for a B sub-pixel region. In the present example, data signal lines L1 to L12 includes 4 sub-sets of lines, L1 to L3, L4 to L6, L7 to L9, and L10 to L12. Since each set of data lines corresponds to the data signal lines L1 to L12, the first set of data lines K1 to K12 also includes 4 sets of lines, K1 to K3, K4 to K6, K7 to K9, and K10 to K12.

The first set of data lines K1 to K12 is coupled to data signal lines L1 to L12 in such an order that the first subset (K1 to K3) of data lines is coupled to the first set (L1 to L3) of data signal lines, the second subset (K4 to K6) is coupled to the second set (L4 to L6), the third subset (K7 to K9) is coupled to the third set (L7 to L9), and the fourth subset (K10 to K12) is coupled to the fourth set (L10 to L12). The order (hereinafter "first order") is also applicable to subsequent transmission lines for any odd-numbered set of data.

With respect to the set of data S13 to S24 sent from the second shift register, the second set of data lines K13 to K24 is coupled to data signal lines L1 to L12 in an order that the first subset (K13 to K15) of the second set of data lines is coupled to the fourth set (L10 to L12) of data signal lines, the second subset (K16 to K18) is coupled to the third set (L7 to L9), the third subset (K19 to K21) is coupled to the second set (L4 to L6), and the fourth subset (K22 to K24) is coupled to the first set (L1 to L3). This order (hereinafter "second order") is likewise applicable to subsequent transmission lines for any even-numbered set of data.

Therefore, for data signal lines defined in N sets, N being an integral, an M-th subset of an odd-numbered set of data lines is coupled to an M-th set of the data signal lines, M being an integral between 1 and N. On the other hand, an M-th subset of an even-numbered set of data lines is coupled to an (N−M+1)-th set of the data signal lines. In one embodiment, the data signal lines include 12 transmission lines and N is equal to 4. In other embodiments, N is equal to 8 and 16 for data signal lines including 24 and 48 transmission lines, respectively.

For the same sub-pixel regions of adjacent pixels respectively associated with a leading subset of a set of data lines and an ending subset of a subsequent set of data lines, the data lines to transmit data signals representing the sub-pixel regions have approximately the same transmission length. For example, data signal S10 of first set of data S1 to S12 and data signal S13 of second set of data S13 to S24, both of which correspond to an R sub-pixel region, are respectively transmitted by data lines K10 and K13. Since data lines K10 and K13 are coupled to a same data signal line L10 following respectively the aforementioned first and second orders, data lines K10 and K13 have almost approximately the same transmission length. The situation is also applicable to data lines K11 and K14 for a G sub-pixel region, and data lines K12 and K15 for a B sub-pixel region. As a result, a pixel including the R, G and B sub-pixels represented by data lines K10 to K12 would not exhibit a different gray scale from an adjacent pixel, such as the R, G and B sub-pixels represented by data lines K13 to K15. Similarly, a pixel including the R, G and B sub-pixels of the second set of data represented by data lines K22 to K24 would not exhibit a different gray scale from an adjacent pixel, such as the R, G and B sub-pixels of a third set of data represented by data lines K25 to K27.

The subject invention also provides a method for providing data to an LCD panel. The method includes providing a plurality of sets of data signal lines, and a plurality of sets of data lines alternating in odd-numbered and even-numbered sets. Each data line is coupled to one of the plurality of data signal lines. Each set of data lines corresponds to the plurality of data signal lines, and includes a plurality of subsets, each including a first line for an R sub-pixel region, a second line for a G sub-pixel region, and a third line for a B sub-pixel region of a pixel formed in the LCD panel. Each set of the second transmission lines is provided with a plurality of subsets, each subset being associated with a pixel formed in the LCD device. An M-th subset of each of the odd-numbered sets of the second transmission lines is coupled to an M-th set of the first transmission lines, M being an integral between 1 and N, and an M-th subset of each of the even-numbered sets of the second transmission lines is coupled to an (N−M+1)-th set of the first transmission lines. A first set of data is provided from the plurality of first transmission lines to the odd-numbered sets of the second transmission lines. Following the transmission of the first set of data, a second set of data is provided from the plurality of first transmission lines to the even-numbered sets of the second transmission lines.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display (LCD) interface, comprising:
    a plurality of first transmission lines; and
    a plurality of second transmission lines, each being coupled to one of the plurality of first transmission lines,
    wherein the plurality of second transmission lines includes a plurality of sets, alternating in odd-numbered and even-numbered sets, each set of the second transmission lines corresponding to the plurality of first transmission lines, and including a plurality of subsets, each subset including a first line for a first color region, a second line for a second color region, and a third line for a third color region of a pixel formed in the LCD panel, and
    wherein the plurality of first transmission lines includes a plurality of sets, each set of first transmission line including a first line for a first color region, a second line for a second color region, and a third line for a third color region of a pixel, such that a first set of first transmission lines is coupled to a first subset of each of the odd-numbered sets of the second transmission lines and a final subset of each of the even-numbered sets of the second transmission lines.

2. The interface of claim 1, wherein a second set of the first transmission lines is coupled to a second subset of each of the odd-numbered sets of the second transmission lines and a penult subset of each of the even-numbered sets of the second transmission lines.

3. The interface of claim 1, wherein the plurality of first transmission lines include N sets of transmission lines such that an M-th subset of each of the odd-numbered sets of the second transmission lines is coupled to an M-th set of the first transmission lines, M being an integral between 1 and N.

4. The interface of claim 1, wherein the plurality of first transmission lines include N sets of transmission lines such that an M-th subset of each of the even-numbered sets of the second transmission lines is coupled to an (N−M+1)-th set of the first transmission lines, M being an integral between 1 and N.

5. The interface of claim 1, wherein the first color region is a red sub-pixel region.

6. The interface of claim 1, wherein the second color region is a green sub-pixel region.

7. The interface of claim 1, wherein the third color region is a blue sub-pixel region.

8. The interface of claim 1, further comprising a switch disposed on each second transmission line.

9. A liquid crystal display (LCD) interface, comprising:
    a plurality of first transmission lines including N sets of transmission lines, each set of the first transmission lines being associated with a pixel formed in the LCD device; and
    a plurality of second transmission lines, each being coupled to one the plurality of first transmission lines, the plurality of second transmission lines including a plurality of sets, alternating in odd-numbered and even-numbered sets, each set of the second transmission lines corresponding to the plurality of first transmission lines, and each set including a plurality of subsets, each being associated with a pixel formed in the LCD device,
    wherein an M-th subset of each of the odd-numbered sets of the second transmission lines is coupled to an M-th set of the first transmission lines, and an M-th subset of each of the even-numbered sets of the second transmission lines is coupled to an (N−M+1)-th set of the first transmission lines, M being an integral between 1 and N.

10. The interface of claim 9, wherein the first transmission lines include 12 transmission lines and N is equal to 4.

11. The interface of claim 9, wherein the first transmission lines include 24 transmission lines and N is equal to 8.

12. The interface of claim 9, wherein the first transmission lines include 48 transmission lines and N is equal to 16.

13. A method of providing data to a liquid crystal display (LCD) device, comprising:
    providing a plurality of sets of first transmission lines;
    providing a plurality of sets of second transmission lines alternating in odd-numbered and even-numbered sets;
    coupling each of the second transmission lines to one of the plurality of first transmission lines such that each set of second transmission lines corresponds to the plurality of first transmission lines;

providing a plurality of subsets for each set of the second transmission lines, each subset being associated with a pixel formed in the LCD device;

coupling an M-th subset of each of the odd-numbered sets of the second transmission lines to an M-th set of the first transmission lines, M being an integral between 1 and N;

coupling an M-th subset of each of the even-numbered sets of the second transmission lines to an (N−M+1)-th set of the first transmission lines;

providing a first set of data from the plurality of first transmission lines to the odd-numbered sets of the second transmission lines; and following the first set of data, providing a second set of data from the plurality of first transmission lines to the even-numbered sets of the second transmission lines.

14. The method of claim 13, further comprising providing an odd-numbered set of data from the plurality of first transmission lines to the odd-numbered sets of the second transmission lines.

15. The method of claim 13, further comprising providing an even-numbered set of data from the plurality of first transmission lines to the even-numbered sets of the second transmission lines.

16. The method of claim 13, further comprising providing each set of the first transmission lines with a first line for a first color region, a second line for a second color region, and a third line for a third color region of a pixel formed in the LCD device.

17. The method of claim 13, further comprising providing each subset of the second transmission lines with a first line for a first color region, a second line for a second color region, and a third line for a third color region of a pixel formed in the LCD device.

18. The method of claim 13, further comprising providing a switch on each second transmission line.

* * * * *